United States Patent
Emborg

(10) Patent No.: US 9,856,638 B2
(45) Date of Patent: Jan. 2, 2018

(54) DRAIN ELEMENT

(75) Inventor: Michaeel Emborg, Kirke Saaby (DK)

(73) Assignee: Rockwool International A/S (DK)

( * ) Notice: Subject to any disclaimer, the term of this patent is extended or adjusted under 35 U.S.C. 154(b) by 335 days.

(21) Appl. No.: 14/373,188

(22) PCT Filed: Aug. 24, 2012

(86) PCT No.: PCT/EP2012/066558
§ 371 (c)(1),
(2), (4) Date: Feb. 25, 2015

(87) PCT Pub. No.: WO2013/113410
PCT Pub. Date: Aug. 8, 2013

(65) Prior Publication Data
US 2015/0167286 A1 Jun. 18, 2015

(30) Foreign Application Priority Data

Jan. 30, 2012 (EP) ...................... 12153117

(51) Int. Cl.
*E02B 11/00* (2006.01)
*E03F 5/04* (2006.01)
*E02D 3/10* (2006.01)
*B01D 39/16* (2006.01)

(52) U.S. Cl.
CPC .......... *E03F 5/0407* (2013.01); *B01D 39/163* (2013.01); *E02B 11/005* (2013.01); *E02D 3/10* (2013.01); *Y10T 29/49826* (2015.01)

(58) Field of Classification Search
USPC ....................... 405/36, 38, 43, 50
See application file for complete search history.

(56) References Cited

U.S. PATENT DOCUMENTS

| | | | | |
|---|---|---|---|---|
| 4,572,706 A * | 2/1986 | Tsuruta | .................. | A01G 25/00 405/36 |
| 5,174,685 A * | 12/1992 | Buchanan | ................ | H02G 1/06 405/174 |
| 5,810,509 A * | 9/1998 | Nahlik, Jr. | .............. | E02B 11/00 405/43 |
| 6,389,748 B1 * | 5/2002 | De Groot | ............. | A01G 31/001 47/64 |
| 6,562,267 B1 * | 5/2003 | Hansen | ................ | A01G 31/001 264/109 |
| 2004/0265061 A1 * | 12/2004 | Chaffee | ................... | E03F 1/002 405/43 |
| 2014/0314485 A1 * | 10/2014 | Emborg | .................. | E03F 1/002 405/36 |

(Continued)

FOREIGN PATENT DOCUMENTS

| | | |
|---|---|---|
| DE | 1484369 | 3/1969 |
| DE | 2207218 | 2/1972 |

(Continued)

*Primary Examiner* — Sean Andrish
(74) *Attorney, Agent, or Firm* — Tarolli, Sundheim, Covell & Tummino LLP

(57) ABSTRACT

The invention relates to a drain element formed of a hydrophilic coherent man-made vitreous fiber substrate (MMVF substrate), wherein the MMVF substrate comprises man-made vitreous fibers bonded with a cured binder composition, the MMVF substrate having opposed first and second ends and a passage which extends from a first opening in the first end to a second opening in the second end.

40 Claims, 4 Drawing Sheets

(56) References Cited

U.S. PATENT DOCUMENTS

2015/0247313 A1* 9/2015 Emborg .................. E03F 5/101
                                                          138/177

FOREIGN PATENT DOCUMENTS

| DE | 3504873    | 2/1985  |
|----|------------|---------|
| DE | 3815443    | 5/1988  |
| EP | 1961291    | 8/2008  |
| WO | 9707664    | 3/1997  |
| WO | 0123681    | 4/2001  |
| WO | 0185440    | 11/2001 |
| WO | 2004007615 | 1/2004  |
| WO | 2007129202 | 11/2007 |

* cited by examiner

DRAIN ELEMENT

The present invention relates to a drain element, the use of a drain element, a method of constructing a drainage system and a method of draining water.

BACKGROUND OF THE INVENTION

Precipitation such as rain, snow, sleet, hail and the like results in surface water which can cause the ground to become waterlogged. Drainage systems are known such as that described in DE3815443. This document discloses a drainpipe with holes and any number of absorbent rollers fixed onto the pipe. The rollers are made of stone wool or glass wool. The rollers are not continuous along the pipe and there are sections in which the drainpipe with holes is exposed to the earth. One disadvantage of this is that earth can reduce the usable width of the pipe, or even block the pipe completely by earth entering the pipe via the holes in the areas in which there is no roller.

It is also known to use a drainpipe with holes surrounded by gravel and connected to a pump to drain waterlogged areas. The main purpose of the gravel is to create an area around the drain pipe where water can run relatively freely towards the drainpipe, since the capacity of the gravel to hold water is limited by the available space between the pieces of gravel. Often a geo-textile is wrapped around the drainpipe in order to prevent soil from entering the drainpipe through its holes.

There is also the need to remove water from a drainage system and transport it underground such as in the case of a basement drainage system. Such a basement drainage system is described in WO01/85440. This document discloses the use of a perforated drainpipe which conveys the water from the drainage system away from the basement wall. Also in this drainage system the drainpipes are normally wrapped with a geo-textile and embedded in gravel that ensures free flow of water to the perforated drainpipe.

There is a need for a drain that can absorb water from the ground and store the water until it can be dissipated back to the ground. There is also a need for a drain that can convey water to a disposal means. Further there is a need for a drain that does not become contaminated with earth from the ground. Further, there is a need for a device which can be installed without being wrapped in a geo-textile material. Further there is a need for a drain which has a buffering capacity to hold water as well as a capacity to convey water. There is a need to produce such a drain which is environmentally acceptable and economical in terms of production, installation and use. The present invention solves the above detailed problems.

SUMMARY OF INVENTION

In a first aspect of the invention, there is provided a drain element formed of a hydrophilic coherent man-made vitreous fibre substrate (MMVF substrate), wherein the MMVF substrate comprises man-made vitreous fibres bonded with a cured binder composition, the MMVF substrate having opposed first and second ends and a passage which extends from a first opening in the first end to a second opening in the second end.

In a second aspect of the invention, there is provided a use of a drain element formed of a hydrophilic coherent man-made vitreous fibre substrate (MMVF substrate), wherein the MMVF substrate comprises man-made vitreous fibres bonded with a cured binder composition, the MMVF substrate having opposed first and second ends and a passage which extends from a first opening in the first end to a second opening in the second end, wherein at least one drain element is positioned in the ground, whereby water in fluid communication with the drain element is:
 (i) absorbed by the MMVF substrate, and/or
 (ii) conveyed along the passage.

In a third aspect of the invention, there is provided a method of constructing a drainage system comprising positioning at least one drain element in the ground, wherein the at least one drain element is formed of a hydrophilic coherent man-made vitreous fibre substrate (MMVF substrate), wherein the MMVF substrate comprises man-made vitreous fibres bonded with a cured binder composition, the MMVF substrate having opposed first and second ends and a passage which extends from a first opening in the first end to a second opening in the second end, wherein in use, the drain element is arranged such that it is in fluid communication with water to be drained and the water is:
 (i) absorbed by the MMVF substrate, and/or
 (ii) conveyed along the passage.

In a fourth aspect of the invention, there is provided a method of draining water comprising providing at least one drain element formed of a hydrophilic coherent man-made vitreous fibre substrate (MMVF substrate), wherein the MMVF substrate comprises man-made vitreous fibres bonded with a cured binder composition, the MMVF substrate having opposed first and second ends and a passage which extends from a first opening in the first end to a second opening in the second end, positioning the at least one drain element in the ground, whereby water in fluid communication with the drain element is:
 (i) absorbed by the MMVF substrate, and/or
 (ii) conveyed along the passage.

DETAILED DESCRIPTION OF THE INVENTION

MMVF substrates are known for numerous purposes, including for sound and thermal insulation, fire protection and in the field of growing plants. When used for growing plants, the MMVF substrate absorbs water to allow plants to grow. When used for growing plants, it is important that the MMVF substrate does not dry out. In the field of growing plants, an MMVF substrate is normally used instead of soil to grow plants. The relative capillarity of soil and an MMVF substrate is not important in the field of growing plants. WO01/23681 discloses the use of a MMVF substrate as a sewage filter.

The present invention provides the use of a coherent MMVF substrate as a drain element. The man-made vitreous fibres are bonded with cured binder composition and the drain element can retain water within its open pore structure.

The man-made vitreous fibres (MMVF) can be glass fibres, ceramic fibres, basalt fibres, slag wool, stone wool and others, but are usually stone wool fibres. Stone wool generally has a content of iron oxide at least 3% and content of alkaline earth metals (calcium oxide and magnesium oxide) from 10 to 40%, along with the other usual oxide constituents of MMVF. These are silica; alumina; alkali metals (sodium oxide and potassium oxide) which are usually present in low amounts; and can also include titania and other minor oxides.

Fibre diameter is often in the range of 3 to 20 µm, preferably 3 to 5 µm.

The MMVF substrate is in the form of a coherent mass. That is, the MMVF substrate is generally a coherent matrix of MMVF fibres, which has been produced as such, but can also be formed by granulating a slab of MMVF and consolidating the granulated material. The binder may be any of the binders known for use as binders for coherent MMVF products. The MMVF substrate may comprise a wetting agent.

The MMVF substrate is hydrophilic, that is it attracts water. The MMVF substrate is hydrophilic due to the binder system used. In the binder system, the binder itself may be hydrophilic and/or a wetting agent used.

The hydrophilicity of a sample of MMVF substrate can be measured by determining the sinking time of a sample. A sample of MMVF substrate having dimensions of 100×100×65 mm is required for determining the sinking time. A container with a minimum size of 200×200×200 mm is filled with water. The sinking time is the time from when the sample first contacts the water surface to the time when the test specimen is completely submerged. The sample is placed in contact with the water in such a way that a cross-section of 100×100 mm first touches the water. The sample will then need to sink a distance of just over 65 mm in order to be completely submerged. The faster the sample sinks, the more hydrophilic the sample is. The MMVF substrate is considered hydrophilic if the sinking time is less than 120 s. Preferably the sinking time is less than 60 s. In practice, the MMVF substrate may have a sinking time of a few seconds, such as less than 10 seconds.

When the binder is hydrophobic, a wetting agent is additionally included in the MMVF substrate. A wetting agent will increase the amount of water that the MMVF substrate can absorb. The use of a wetting agent in combination with a hydrophobic binder results in a hydrophilic MMVF substrate. The wetting agent may be any of the wetting agents known for use in MMVF substrates that are used as growth substrates. For instance it may be a non-ionic wetting agent such as Triton™ X-100 (polyethylene glycol tert-octylphenyl ether) or Rewopal® (polyethylene glycol diester). Some non-ionic wetting agents may be washed out of the MMVF substrate over time. It is therefore preferable to use an ionic wetting agent, especially an anionic wetting agent, such as linear alkyl benzene sulphonate. These do not wash out of the MMVF substrate to the same extent.

EP1961291 discloses a method for producing water-absorbing fibre products by interconnecting fibres using a self-curing phenolic resin and under the action of a wetting agent, characterised in that a binder solution containing a self-curing phenolic resin and polyalcohol is used. This binder can be used in the present invention. Preferably, the wetting agent does not become washed out of the MMVF substrate and therefore does not contaminate the surrounding ground.

The binder of the MMVF substrate can be hydrophilic. A hydrophilic binder does not require the use of a wetting agent. A wetting agent can be used to increase the hydrophilicity of either a hydrophobic or a hydrophilic binder. This means that the MMVF substrate will absorb a higher volume of water than if the wetting agent is not present. Any hydrophilic binder can be used.

The binder may be a formaldehyde-free aqueous binder composition comprising: a binder component (A) obtainable by reacting at least one alkanolamine with at least one carboxylic anhydride and, optionally, treating the reaction product with a base; and a binder component (B) which comprises at least one carbohydrate, as disclosed in WO2004/007615. This binder is hydrophilic.

WO97/07664 discloses a hydrophilic substrate that obtained its hydrophilic properties from the use of a furan resin as a binder. The use of a furan resin allows the abandonment of the use of a wetting agent. This binder may be used in the present invention.

WO07129202 discloses a hydrophilic curable aqueous composition wherein said curable aqueous composition is formed in a process comprising combining the following components:
(a) a hydroxy-containing polymer,
(b) a multi-functional crosslinking agent which is at least one selected from the group consisting of a polyacid, salt(s) thereof and an anhydride, and
(c) a hydrophilic modifier;
wherein the ratio of (a):(b) is from 95:5 to about 35:65.

The hydrophilic modifier can be a sugar alcohol, monosaccharide, disaccharide or oligosaccharide. Examples given include glycerol, sorbitol, glucose, fructose, sucrose, maltose, lactose, glucose syrup and fructose syrup. This binder can be used in the present invention.

Further, a binder composition comprising:
a) a sugar component, and
b) a reaction product of a polycarboxylic acid component and
an alkanolamine component,
wherein the binder composition prior to curing contains at least 42% by weight of the sugar component based on the total weight (dry matter) of the binder components may be used in the present invention, preferably in combination with a wetting agent.

Binder levels are preferably in the range 0.5 to 5 wt %, preferably 2 to 4 wt % based on the weight of the MMVF substrate.

Levels of wetting agent are preferably in the range 0 to 1 wt %, based on the weight of the MMVF substrate, in particular in the range 0.2 to 0.8 wt %, especially in the range 0.4 to 0.6 wt %.

The MMVF product may be made in any of the ways known to those skilled in the art for production of MMVF growth substrate products. In general, a mineral charge is provided, which is melted in a furnace to form a mineral melt. The melt is then formed into fibres by means of centrifugal fiberisation e.g. using a spinning cup or a cascade spinner, to form a cloud of fibres. These fibres are then collected and consolidated. Binder and optionally wetting agent are usually added at the fiberisation stage by spraying into the cloud of forming fibres. These methods are well known in the art.

The MMVF substrate used as drain element in the present invention preferably has a density in the range of 60 to 150 kg/m$^3$, preferably in the range of 70 to 100 kg/m$^3$, such as around 80 kg/m$^3$. The density of the MMVF substrate is the density of the MMVF substrate as such, that is the density of the MMVF substrate excluding the passage. The passage is not taken into account when calculating the density of the MMVF substrate.

The advantage of this density is that the MMVF substrate has a relatively high compression strength. This is important as the MMVF substrate may be installed in a position where people or vehicles need to travel over the ground in which the MMVF substrate is positioned. Optionally, a force distribution plate is positioned on top of the MMVF substrate in order to distribute the force upon the MMVF substrate. Preferably such a force distribution plate is not required due to the density of the MMVF substrate.

The cross-sectional width and height of the drain element are preferably each independently 10 to 80 cm, more preferably 15 to 40 cm. The advantage of using a drain element with these widths and heights is that it is large enough to be able to store water within the pores of the MMVF substrate and thus buffer an amount of water. The width and heights are small enough for it to be easy to install the drain element underground. The drain element may optionally have a greater height and or width, but this will increase the effort required to install the drain element.

The length of the drain element may be any length, but will normally be in the range of 50 cm to 200 cm, such as around 100 cm. In use the drain element will normally be combined with other drain elements as required for the distance the water is required to be conveyed, or for the size of the ground in which has become waterlogged.

It is envisaged that several drain elements could be in fluid communication with each other by lining up the passages in order to create a longer drain.

Two drain elements may be in fluid communication with each other by being connected by a pipe, wherein the pipe is in fluid communication with the first opening of a first drain element and the second opening of a second drain element. Several drain elements could be in fluid communication with each other in this way. An advantage of using a pipe is that the pipe may be curved in order to change the direction of the flow of water, for example to allow the water to flow round a corner, such as to avoid an obstacle in the ground, or to arrange several drain elements around a building.

It is envisaged that when connecting a series of drain elements together, some of the drain elements may be connected to the next drain element by a pipe, and other drain elements may be connected to the next drain element by lining up the passages.

A perimeter drain can be formed by arranging a number of drain elements around an area to be drained, such as around a building or a car park. The drain elements are arranged so that each passage is in fluid communication with the passage in the next drain. This can be achieved by lining up the passages, or by connecting adjacent drain elements via a pipe. In order to go around corners, such as at the edge of a building, a pipe with a bend can be used. When a pipe is used it is preferably partially embedded in both the adjacent drain elements and lines up with the passages of both the adjacent drain elements. The pipe is preferably not perforated in the sections between the adjacent drain elements to prevent earth from entering the pipe. Alternatively, a drain element can have a passage which has a curve in it to change the direction of the passage to turn around a corner. The passages of the drains are preferably in fluid communication with a water disposal system such as a tank, mains drainage or a water drain reservoir. The passages may be in fluid communication with more than one water disposal system. This has an advantage that water can be disposed of from more than one point, such as at opposite sides of the area to be drained. Where the perimeter drain is around a car park, there is preferably an oil filter between the passage and the water disposal system. The oil filter removes the majority of the oil from the water before it is disposed of and thus is an important environmental consideration. A number of drains, each comprising at least one drain element, could be arranged in parallel with each other at the same height in order to cover a wider width of area. Further, there could be a number of drains, each comprising at least one drain element, arranged at different heights in order to cover a larger height range of drain.

It is however envisaged that the height and the width of the drain elements will be sufficient such that it will not be necessary to install several parallel drains.

The volume of the drain element is preferably 5000 to 700,000 cm$^3$, preferably 20,000 to 200,000 cm$^3$.

Preferably the drain element has a rectangular or square cross-section which makes it easy to manufacture and reduces production wastage of the MMVF substrate. Alternatively the cross-section may be circular, triangular or the like.

Preferably the cross-sectional area of the drain element is substantially continuous along the length. Substantially continuous means that the cross-sectional area is within 10% of the average cross-sectional area, preferably within 5%, most preferably within 1%.

Preferably the cross-sectional area of the first and second openings are in the range 2 to 200 cm$^2$, preferably 5 to 100 cm$^2$.

Preferably the cross-sectional area of the first opening is 0.5% to 15% of the cross-sectional area of the first end MMVF substrate, preferably 1% to 10%.

Preferably the cross-sectional area of the second opening is 0.5% to 15% of the cross-sectional area of the second end MMVF substrate, preferably 1% to 10%.

The openings are such a small percentage of the cross-sectional area of the ends of the drain element since the vast majority of the MMVF substrate is used to buffer the amount of water that is to be conveyed. The larger the proportion of the MMVF substrate, the greater the volume of water that can be buffered by a drain element of a given cross-sectional area.

The cross-sectional area of the passage is preferably substantially continuous along the length of the MMVF substrate. Substantially continuous means that the cross-sectional area is within 10% of the average cross-sectional area, preferably within 5%, most preferably within 1%. If necessary however, the cross-sectional area can be varied according to the requirements of the passage to be smaller or larger.

The passage is preferably straight through the MMVF substrate, that is, the passage takes the most direct route through the MMVF substrate to allow water to take the most direct route along the passage to the second opening.

Alternatively, the passage may be curved within the MMVF substrate, such as to change the direction of the flow of water through the passage. This could be used to bring the second opening closer to the surface of the ground for disposal. Alternatively, a curved passage could be used to change the direction of the passage in a horizontal direction, such as to avoid an obstacle in the ground, or arrange several drain elements around a building.

The passage may have a triangular cross-sectional area. When installed, the base of the triangle is preferably parallel with the base of the drain element. Alternatively the passage can have a semicircular cross-sectional area. Again, the base of the drain element is preferably parallel with the base of the semicircle. Alternatively, the passage can have a circular or a rectangular cross-sectional area.

The passage is preferably positioned centrally in the width of the cross-section of the drain element. The reason that this is substantially centrally, is so that the flow of the water which is to be conveyed will be down the centre of the drain element. This has the advantage that the strength of the drain element is maintained at the sides of the drain element. If however the passage was arranged close to one side of the drain element, this may cause a weakness in the structure.

Preferably the passage is offset towards a first direction. The advantage of this is that the drain element may be installed with the passage at the bottom of the drain element, and it is easier to pump, or drain the water from the drain element since there is a smaller volume of MMVF substrate below the passage. This means that when the drain element takes on water, there is a smaller volume to saturate with water below the passage before the excess water goes into the passage and can be removed. If the drain element were to be installed with the passage at the top there would be a larger volume of MMVF substrate which would need to be saturated with water before the excess water goes into the passage and can be removed.

The drain element may comprise a first part in contact with a second part, wherein the passage is disposed between the first part and the second part. This means that the first part may be preformed with a groove along the length of the MMVF substrate, and when the first part and second parts are joined together, the passage is formed by the groove and the second part. Alternatively the second part may have the groove. Alternatively, both the first and second parts may have a groove and the grooves may be lined up to form the passage when the first and second parts are joined together. The groove or grooves may be of any shape as required to form the passage. The groove or grooves may therefore have a cross-section which is semicircular, triangular, rectangular or the like.

The first and second parts of the MMVF substrate may be joined by placing the two parts together, or using an adhesive. Preferably the water holding capacity of the MMVF substrate is at least 80% of the volume, preferably 80-99%, most preferably 85-95%. The greater the water holding capacity, the more water can be stored for a given volume. The water holding capacity of the MMVF substrate is high due to the open pore structure and the MMVF substrate being hydrophilic.

Preferably the amount of water that is retained by the MMVF substrate when it gives off water is less than 20% vol, preferably less than 10% vol, most preferably less than 5% vol. The water retained may be 2 to 20% vol, such as 5 to 10% vol. The lower the amount of water retained by the MMVF substrate, the greater the capacity of the MMVF substrate to take on more water. The water may be removed from the MMVF substrate by water being conveyed by the passage to a disposal means and/or by dissipating into the ground when the surrounding ground is dry and the capillary balance is such that the water dissipates into the ground.

Preferably the buffering capacity of the MMVF substrate, that is the difference between the maximum amount of water that can be held, and the amount of water that is retained when the MMVF substrate gives off water is at least 60% vol, preferably at least 70% vol, preferably at least 80% vol. The buffering capacity may be 60 to 90% vol, such as 60 to 85% vol. The advantage of such a high buffering capacity is that the MMVF substrate can buffer more water for a given volume, that is the MMVF substrate can store a high volume of water when required, and release a high volume of water into the surrounding ground when the ground dries out. The buffering capacity is so high because MMVF substrate requires a low suction pressure to remove water from the MMVF substrate. This is demonstrated in the Example.

The water holding capacity, the amount of water retained and the buffering capacity of the MMVF substrate can be measured in accordance with European Standard LENT 13041-1999.

The present invention relates to the use of a drain element formed of a hydrophilic coherent man-made vitreous fibre substrate (MMVF substrate), wherein the MMVF substrate comprises man-made vitreous fibres bonded with a cured binder composition, the MMVF substrate having opposed first and second ends and a passage which extends from a first opening in the first end to a second opening in the second end, wherein at least one drain element is positioned in the ground, whereby water in fluid communication with the drain element is:

(i) absorbed by the MMVF substrate, and/or (ii) conveyed along the passage.

In use, the MMVF substrate is positioned in the ground and is preferably buried within the ground. Preferably the MMVF substrate is completely covered with earth. Earth includes sediment, sand, clay, dirt, gravel and the like. For example, in waterlogged areas the MMVF substrate may be buried under at least 5 cm of earth, such as at least 20 cm of earth, more preferably at least 40 cm of earth, most preferably at least 50 cm of earth. If the drain element is used for drainage of basement walls the drain may be arranged as deep as 2 to 3 meters below the ground surface.

An advantage of using the drain element according to the invention is that the drain element can absorb water and store it within its open pore structure and the drain element can convey water along the passage towards the second opening. This means that the drain element can store water when required, and also convey water to a disposal means when required. An advantage of storing the water is that when the surrounding ground is dry enough, the water stored in the MMVF substrate can dissipate from the substrate into the ground. This means that it is not necessary to remove the water and arrange to dispose of it. The drain element can store the water and then gradually dissipate it to the ground when the capillary balance between the MMVF substrate and the ground allows the water to dissipate into the ground.

The water can be conveyed by gravity along the passage, for example, by installing the MMVF substrate with a slope such that the second end of the MMVF substrate is lower than the first end of the MMVF substrate. Preferably the angle of the slope is 2 to 10 degrees from horizontal. An advantage of installing the drain with a slope is that it is not necessary to pump the water from the drain element.

Alternatively, a pump can be in fluid communication with the second opening of the passage, wherein the pump conveys water towards the second opening of the passage. The pump may be in fluid communication with the second opening by a conduit, such as a pipe. The water can be pumped along the passage to a water disposal system such as a tank, mains drainage or a water drain reservoir. An advantage of using a pump is that the drain element can be installed without a slope and therefore on installation it is not necessary to dig deeper at one end of the installation.

It is possible to have both a drain element installed on a slope and a pump system.

In use, the passage is preferably offset towards a first direction and the MMVF substrate is oriented such that the first direction is down. It is advantageous for the passage to be at the bottom of the MMVF substrate.

A water drain reservoir is a device that can hold water and gradually dissipate water to the ground. Preferably, a water drain reservoir comprises a coherent man-made vitreous fibre substrate (MMVF substrate) and a conduit having two open ends, wherein the MMVF substrate comprises man-made vitreous fibres bonded with a cured binder composition, wherein a first open end of the conduit is in fluid communication with the MMVF substrate and the second end of the conduit is in fluid communication with water from the passage of the drain element. The conduit is preferably a pipe. The MMVF substrate of the water drain reservoir preferably has the same density and composition as the MMVF substrate of a drain element.

In use, water is absorbed into the MMVF substrate of the water drain reservoir. Water is stored in the MMVF substrate of the water drain reservoir when the surrounding ground is saturated, that is the capillary balance means that the water is retained within the MMVF substrate of the water drain reservoir. As the surrounding ground dries out, the capillary balance shifts, and the water dissipates from the MMVF substrate of the water drain reservoir into the surrounding ground. In this way, water is held within the MMVF substrate of the water drain reservoir when the surrounding ground is saturated. When the surrounding ground dries out, the water dissipates from the MMVF substrate of the water drain reservoir into the ground. The MMVF substrate of the water drain reservoir is then able to take on more water, when this flows down the conduit, preferably a pipe, into the MMVF substrate of the water drain reservoir.

It is not necessary to wrap the drain element of the present invention in any geo-textile material on installation because the MMVF substrate acts like a filter itself in order to prevent any contaminate such as earth entering the drain element and blocking the passage.

The MMVF substrate can absorb water from the ground and the water is optionally conveyed along the passage. In this use, the MMVF substrate will be installed to drain waterlogged ground, particularly when precipitation such as rain, snow, sleet, hail and the like results in surface water which causes the ground to become waterlogged. This can commonly occur near to buildings, particularly where a portion of the surrounding ground is covered by buildings, paving, tarmac or the like without adequate drainage. If there is not adequate drainage, this puts pressure on the ground surrounding this area to dissipate the surface water that has accumulated. This results in the surrounding area becoming waterlogged and needing to be drained.

The drain element of the present invention can be used to drain the waterlogged ground such as in a ground drainage system comprising a plurality of drain elements. This can be by absorbing the excess water into the open pore structure of the MMVF substrate and storing the water until the ground dries out and then gradually dissipating the water to the ground. The water logged ground can also be drained by water being conveyed along the passages of the drain elements towards the second opening and to a disposal system, such as a tank, mains drainage or a water drain reservoir. The water can be conveyed from anywhere along the drain elements to the second opening. If there is a low level of excess water in the ground, the MMVF substrate can store this excess water until the ground is dry enough to dissipate the water back to the ground. If there is a high level of excess water, this can be conveyed along the passage to a disposal system. If a pump is connected to the drain element, the user has the option to only use the pump to convey the water along the passage when there is a high amount of excess water. When there is a low amount of excess water, the MMVF substrate will store the water and it is unnecessary to turn the pump on. The invention therefore provides an environmentally friendly way to handle excess water, by only using the pump when there is a large amount of excess water.

In use, water may be conveyed along the passage. The water may be conveyed from the first end of the MMVF substrate to the second end of the MMVF substrate. In this case, the first end of the MMVF substrate may be in fluid communication with water from a drainage system. The drainage system may be a drainage system of basement walls. In a drainage system of basement walls, water may be collected at the bottom of the basement walls and the drain elements of the invention can be used to convey the water to a disposal system such as a tank, mains drainage or a water drain reservoir. The MMVF substrate can also be used to store some of the water initially. This means that the drain elements will draw the water from the basement drainage system, and either the water will be held within a MMVF substrate, or will be conveyed along the passages of the drain elements to a disposal system such as mains drainage, a tank or a water drain reservoir.

In use, the first opening of the drain element is preferably closed to prevent earth from entering the passage and reducing the size of the passage. Where more than one drain elements are arranged in fluid communication with each other, only the first opening of the drain element furthest from the disposal system is preferably closed. This is to prevent earth entering the passage, whilst still allowing water to be conveyed along the passages towards a disposal system. The first opening may be closed by arranging a plate over the opening, such as an MMVF plate, a metal plate, a plastic plate or the like. Alternatively, the first opening may be plugged, such as with a plug made from MMVF, metal, plastic or the like. The first end may be wrapped in a geo-textile material to close the first opening.

There is provided a method of constructing a drainage system comprising positioning at least one drain element in the ground, wherein the at least one drain element is formed of a hydrophilic coherent man-made vitreous fibre substrate (MMVF substrate), wherein the MMVF substrate comprises man-made vitreous fibres bonded with a cured binder composition, the MMVF substrate having opposed first and second ends and a passage which extends from a first opening in the first end to a second opening in the second end, wherein in use, the drain element is arranged such that it is in fluid communication with water to be drained and the water is:
  (i) absorbed by the MMVF substrate, and/or
  (ii) conveyed along the passage.

In this method, the drain element may be installed on a slope, and/or connected to a pump. The second opening can be connected to a disposal system such as a tank mains drainage, or a water drain reservoir.

There is provided a method of draining water comprising providing at least one drain element formed of a hydrophilic coherent man-made vitreous fibre substrate (MMVF substrate), wherein the MMVF substrate comprises man-made vitreous fibres bonded with a cured binder composition, the MMVF substrate having opposed first and second ends and a passage which extends from a first opening in the first end to a second opening in the second end, positioning the at least one drain element in the ground, whereby water in fluid communication with the drain element is:
  (i) absorbed by the MMVF substrate, and/or
  (ii) conveyed along the passage.

The MMVF substrate may absorb water from the ground and the water is optionally conveyed along the passage. The first and of the MMVF substrate may be in fluid communication with water from a drainage system, for instance a drainage system of basement walls.

DETAILED DESCRIPTION OF FIGURES

Figure 1:
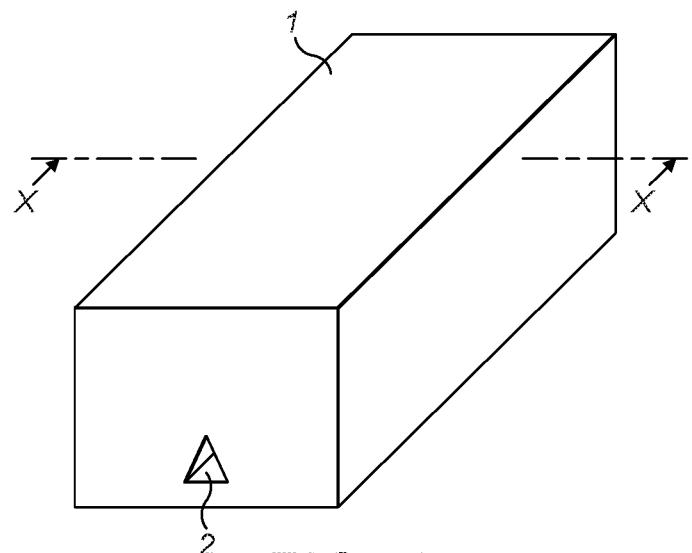
FIG. 1 shows a drain element

FIG. 1 shows a drain element 1 with a passage 2 which extends from the first end of the MMVF substrate to the second end of the MMVF substrate. The passage is towards the bottom of the MMVF substrate.

Figure 2:
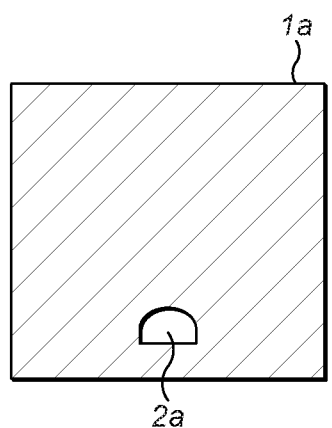
FIG. 2 shows a cross-section of a drain element

FIG. 2 shows the cross-section of a drain element 1a having a semi-circular passage 2a.

Figure 3:
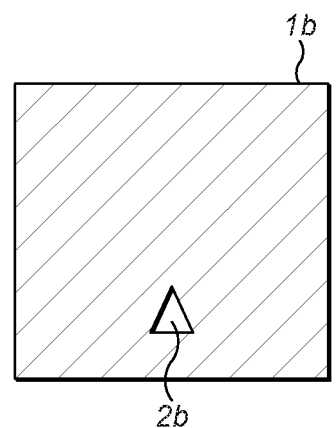
FIG. 3 shows a cross-section of an alternative drain element

FIG. 3 shows the cross-section of a drain element 1b having a triangular passage 2b.

Figure 4:
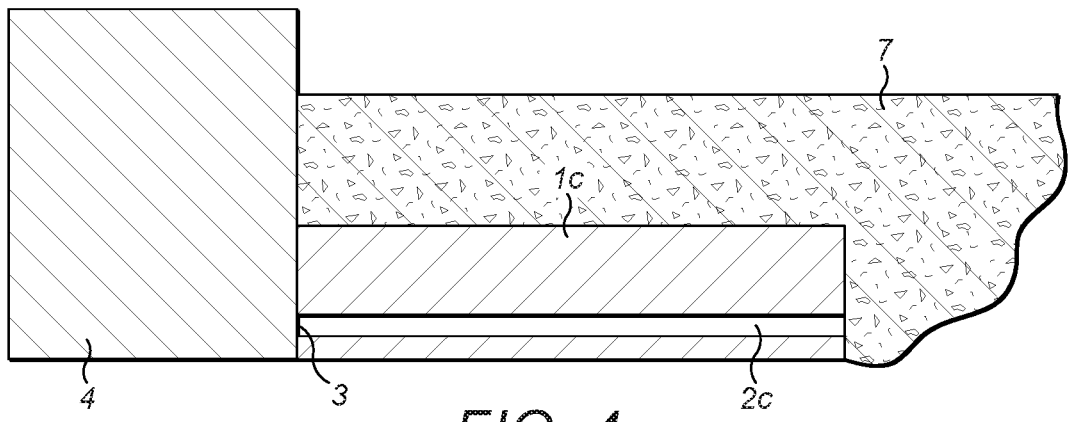
FIG. 4 shows a cross-section of a ground drainage system

FIG. 4 shows a cross-section of a drain element 1c with a passage 2c. The second opening 3 of the passage 2c is connected to a disposal system 4, and in use, water is conveyed from the ground 7, into the drain element. Water may also be conveyed from the ground, into the passage 2c to the disposal system 4.

Figure 5:
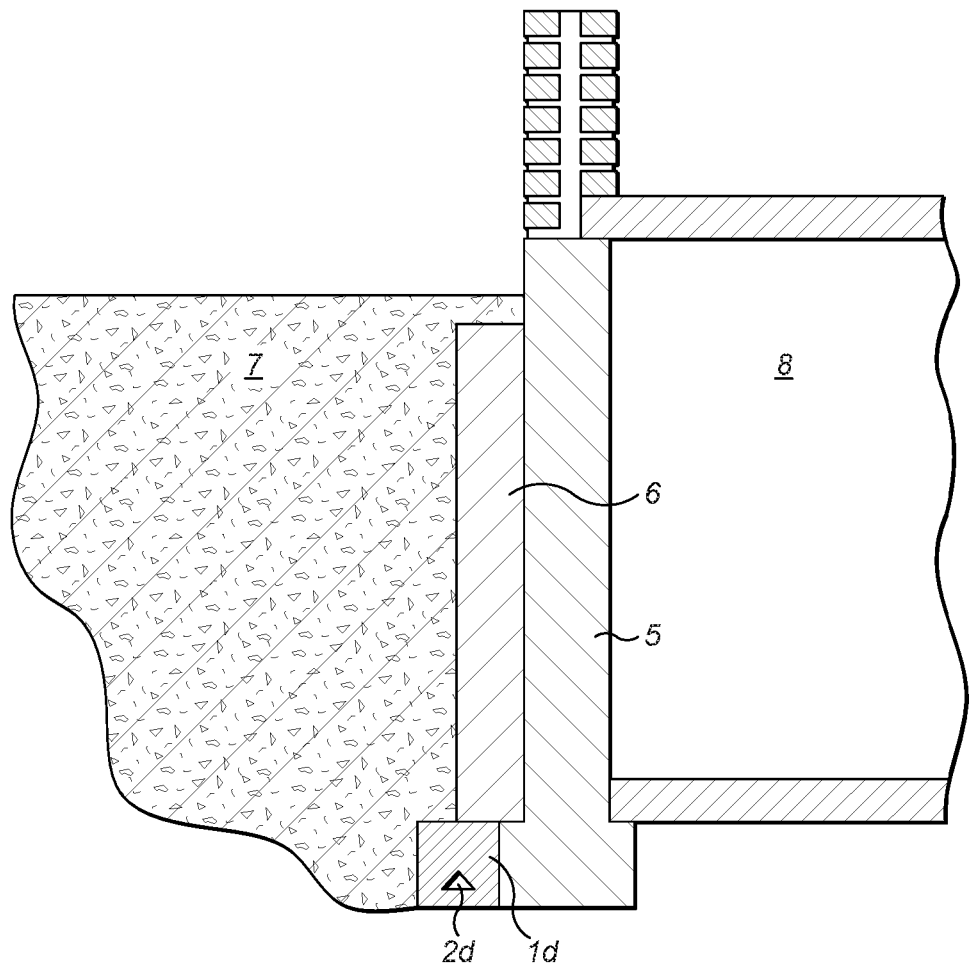
FIG. 5 shows a cross-section of a drainage system of basement walls

FIG. 5 shows a cross-section of a basement 8 with a basement wall 5 and a drainage system 6 in fluid communication with a drain element 1d positioned in the ground 7. In use, water is conveyed from the basement wall drainage system 6, along the passage 2d, to a disposal system which is not shown. The drain element 1d comprises two parts wherein the passage 2d is disposed between the first part and the second part.

Figure 6:
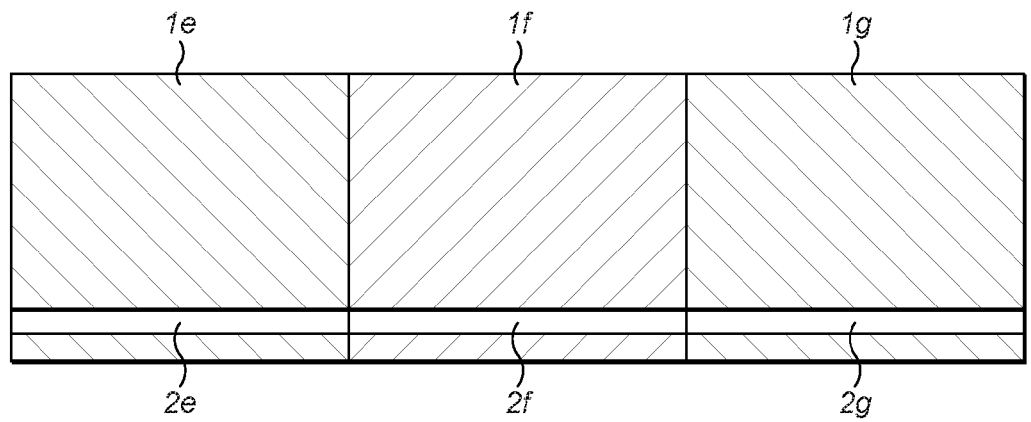
FIG. 6 shows a cross-section of three connected drain elements

FIG. 6 shows three drain elements 1e, 1f and 1g each with a passage 2e, 2f and 2g respectively. The drain element 1f is arranged between drain elements 1e and 1g such that the passages 2e, 2f and 2g form a continuous passage.

Figure 8:
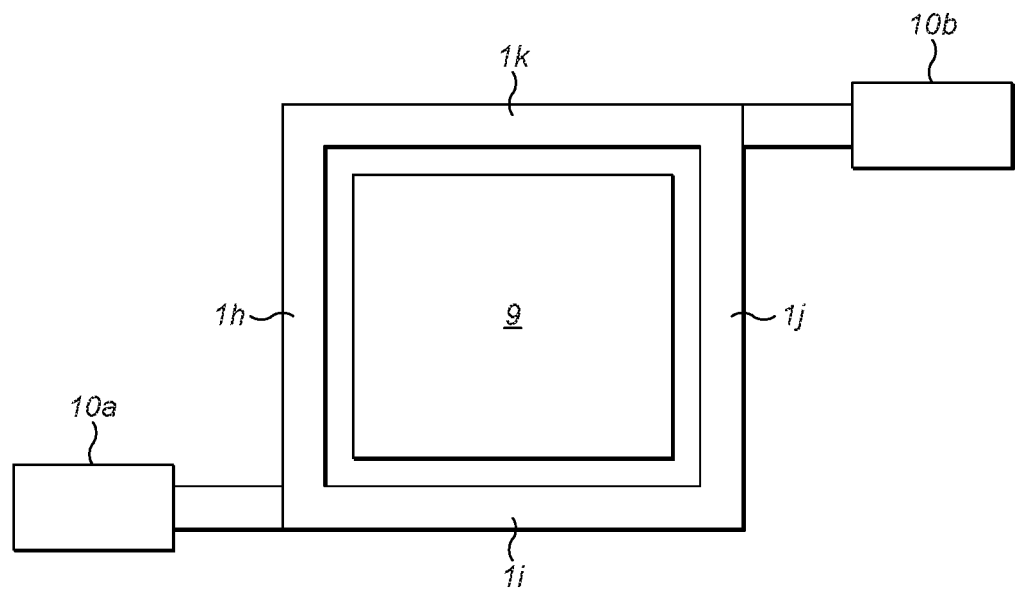
FIG. 8 shows a perimeter drain around a building

FIG. 8 shows a building 9, surrounded by on each side by drain elements 1h, 1i, 1j and 1k. The drain elements are arranged so that the passage of each drain is in fluid communication with the passage in the drain next to it. The passage of each drain is in the bottom part of each drain element. There are two water drain reservoirs, 10a and 10b, each in fluid communication with each of the drain elements. The water drain reservoirs are arranged at opposite corners of the drain elements to allow water to drain in two different directions. There may be one or more water disposal systems, such as two, three, or four water disposal systems. The water disposal systems may be a tank, water drain reservoir or mains drainage.

Figure 9:
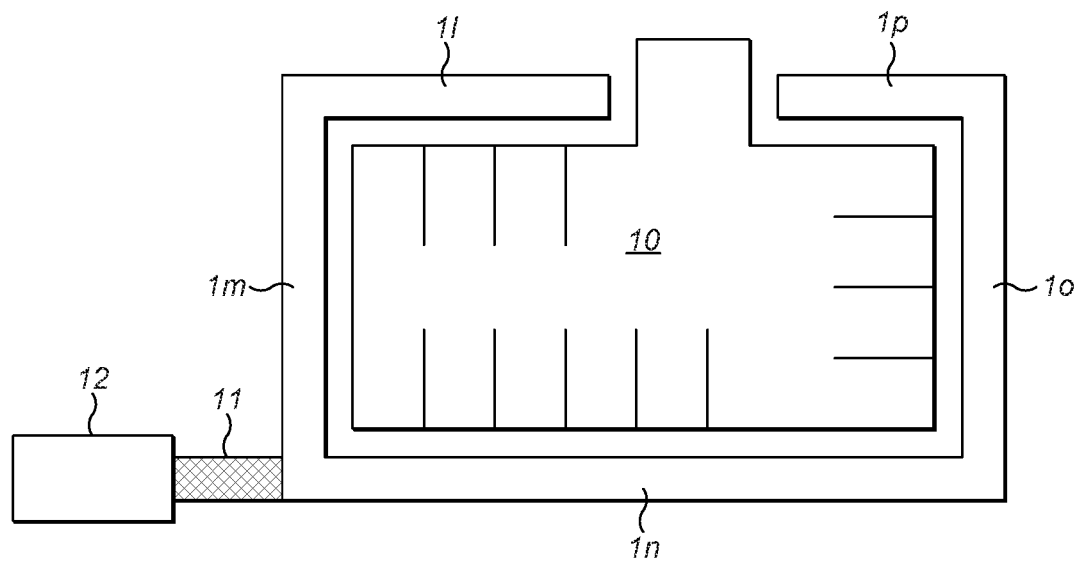
FIG. 9 shows a drain around a car park

FIG. 9 shows a car park 10, with drain elements 1l, 1m, 1n, 1o and 1p around the outside. There is no drain element between 1l and 1p as the entrance to the car park is between these points. There is an oil filter 1l, between the drain elements 1l, 1m, 1n, 1o and 1p and the water disposal system 12.

The invention will now be described in the following example which does not limit the scope of the invention.

EXAMPLE

Figure 7:
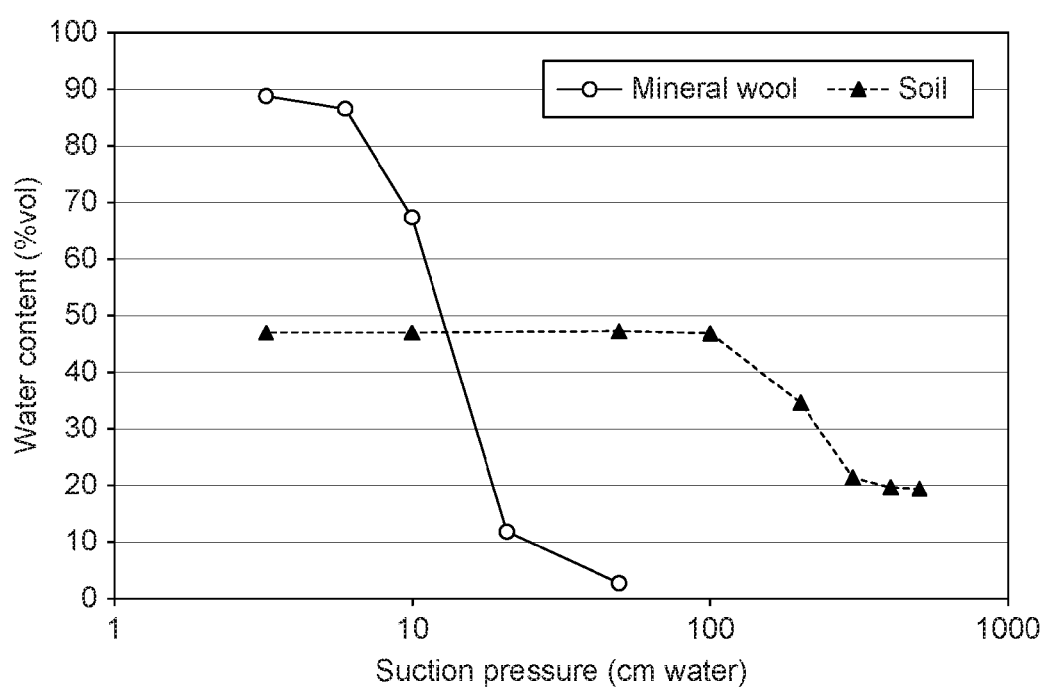
FIG. 7 shows the water holding capacity of an MMVF substrate according to the invention as discussed in the Example

The water holding capacity of a MMVF substrate and silt loam were tested in accordance with EN 13041-1999. The MMVF substrate was a stone wool fibre product with a phenol-urea formaldehyde (PUF) binder and a non-ionic surfactant wetting agent. The results are shown in FIG. 7.

The MMVF substrate has a maximum water content of 90% vol. When the MMVF substrate gives off water, it retains about 2-5% vol of water. This means that the MMVF substrate has a buffering capacity of 85-88% vol. This shows that the MMVF substrate has a high maximum water content, as well as a lower water retention level.

The maximum water content of the silt loam is similar lower than the MMVF substrate. The capillarity of the silt loam is much higher than that of the MMVF substrate, which means you need a suction pressure of several meters to withdraw water from the silt loam. This means that the soil will easily drain water from the MMVF substrate as soon as the soil is not saturated.

It will be appreciated by the skilled person that any of the preferred features of the invention may be combined in order to produce a preferred method, product or use of the invention.

The invention claimed is:

1. A drain element formed of a hydrophilic coherent man-made vitreous fibre substrate (MMVF substrate), wherein the MMVF substrate comprises man-made vitreous fibres bonded with a cured binder composition, the MMVF substrate having opposed first and second ends and a passage which extends from a first opening in the first end to a second opening in the second end;
   wherein the water holding capacity of the MMVF substrate is at least 80% of the volume.

2. The drain element according to claim 1, wherein the MMVF substrate has a density in the range 60 to 150 kg/m$^3$.

3. The drain element according to claim 2, wherein the MMVF substrate has a density in the range 70 to 100 kg/m$^3$.

4. The drain element according to claim 1, wherein the MMVF substrate comprises a wetting agent.

5. The drain element according to claim 4, wherein the MMVF substrate comprises 0 to 1 wt % wetting agent, based on the weight of the MMVF substrate.

6. The drain element according to claim 5, wherein the MMVF substrate comprises 0.2 to 0.8 wt % wetting agent, based on the weight of the MMVF substrate.

7. The drain element according to claim 6, wherein the MMVF substrate comprises 0.4 to 0.6 wt % wetting agent, based on the weight of the MMVF substrate.

8. The drain element according to claim 1 wherein a width and height of the drain element are each independently 10 to 80 cm.

9. The drain element according to claim 8 wherein the width and height of the drain element are each independently 15 to 40 cm.

10. The drain element according to claim 1, wherein a volume of the drain element is 5000 to 700,000 cm$^3$.

11. The drain element according to claim 10, wherein the volume of the drain element is 20,000 to 200,000 cm$^3$.

12. The drain element according to claim 1, wherein a cross-sectional area of the first and second openings are both independently 0.5-15% of a cross-sectional area of the first and second ends of the MMVF substrate respectively.

13. The drain element according to claim 12, wherein the cross-sectional area of the first and second openings are both independently 1-10% of the cross-sectional area of the first and second ends of the MMVF substrate respectively.

14. The drain element according to claim 1, wherein the passage is offset towards a first direction.

15. The drain element according to claim 1, wherein the MMVF substrate comprises a first part in contact with a second part, wherein the passage is disposed between the first part and the second part.

16. A method of constructing a drainage system comprising positioning at least one drain element in the ground, wherein the at least one drain element is formed of a hydrophilic coherent man-made vitreous fibre substrate (MMVF substrate), wherein the MMVF substrate comprises man-made vitreous fibres bonded with a cured binder composition, the MMVF substrate having opposed first and second ends and a passage which extends from a first opening in the first end to a second opening in the second end, wherein, in use, the drain element is arranged such that the at least one drain element is in fluid communication with water to be drained and the water is:
  (i) absorbed by the MMVF substrate, or
  (ii) absorbed by the MMVF substrate and conveyed along the passage;
  wherein the water holding capacity of the MMVF substrate is at least 80% of the volume.

17. A method of draining water comprising providing at least one drain element formed of a hydrophilic coherent man-made vitreous fibre substrate (MMVF substrate), wherein the MMVF substrate comprises man-made vitreous fibres bonded with a cured binder composition, the MMVF substrate having opposed first and second ends and a passage which extends from a first opening in the first end to a second opening in the second end, positioning the at least one drain element in the ground, whereby water in fluid communication with the at least one drain element is:
  (i) absorbed by the MMVF substrate, or
  (ii) absorbed by the MMVF substrate and conveyed along the passage;
  wherein the water holding capacity of the MMVF substrate is at least 80% of the volume.

18. The method according to claim 17, wherein the MMVF substrate absorbs water from the ground and the water is conveyed along the passage.

19. The method according to claim 17, wherein the first end of the MMVF substrate is in fluid communication with water from a drainage system.

20. The method according to claim 19, wherein the drainage system is a drainage system of basement walls.

21. The method according to claim 17, wherein the passage is offset towards a first direction and wherein the MMVF substrate is oriented such that the first direction is down.

22. The method according to claim 17, wherein the MMVF substrate is installed with a slope such that the second end of the MMVF substrate is lower than the first end of the MMVF substrate.

23. The method according to claim 17, further comprising a pump in fluid communication with the second opening of the passage, wherein the pump conveys water towards the second opening of the passage.

24. The method according to claim 17, wherein the MMVF substrate absorbs water from the ground and the water is conveyed along the passage.

25. The method according to claim 17, wherein the first end of the MMVF substrate is in fluid communication with water from a drainage system.

26. The method according to claim 25, wherein the drainage system is a drainage system of basement walls.

27. The method according to claim 17, wherein the MMVF substrate has a density in the range 60 to 150 kg/m$^3$.

28. The method according to claim 27, wherein the MMVF substrate has a density in the range 70 to 100 kg/m$^3$.

29. The method according to claim 17, wherein the MMVF substrate comprises a wetting agent.

30. The method according to claim 17, wherein the MMVF substrate comprises 0 to 1 wt % wetting agent, based on the weight of the MMVF substrate.

31. The method according to claim 29, wherein the MMVF substrate comprises 0.2 to 0.8 wt % wetting agent, based on the weight of the MMVF substrate.

32. The method according to claim 31, wherein the MMVF substrate comprises 0.4 to 0.6 wt % wetting agent, based on the weight of the MMVF substrate.

33. The method according to claim 17, wherein a width and height of the at least one drain element are each independently 10 to 80 cm.

34. The method according to claim 33, wherein the width and height of the at least one drain element are each independently 15 to 40 cm.

35. The method according to claim 17, wherein a volume of the at least one drain element is 5000 to 700,000 cm$^3$.

36. The method according to claim 35, wherein the volume of the at least one drain element is 20,000 to 200,000 cm$^3$.

37. The method according to claim 17, wherein a cross-sectional area of the first and second openings are both independently 0.5-15% of a cross-sectional area of the first and second ends of the MMVF substrate respectively.

38. The method according to claim 37, wherein the cross-sectional area of the first and second openings are both independently 1-10% of the cross-sectional area of the first and second ends of the MMVF substrate respectively.

39. The method according to claim 17, wherein the passage is offset towards a first direction.

40. The method according to claim 17, wherein the MMVF substrate comprises a first part in contact with a second part, wherein the passage is disposed between the first part and the second part.

* * * * *